(12) United States Patent
Jagow et al.

(10) Patent No.: US 12,342,749 B2
(45) Date of Patent: Jul. 1, 2025

(54) SELECTABLE METER OR INDUCTOR FEED FOR SEEDS

(71) Applicant: Bourgault Industries Ltd., St. Brieux (CA)

(72) Inventors: Scot Jagow, St. Brieux (CA); Jami Rieder, St. Brieux (CA)

(73) Assignee: Bourgault Industries Ltd., St. Brieux (CA)

( * ) Notice: Subject to any disclaimer, the term of this patent is extended or adjusted under 35 U.S.C. 154(b) by 723 days.

(21) Appl. No.: 17/740,424

(22) Filed: May 10, 2022

(65) Prior Publication Data
US 2022/0264788 A1  Aug. 25, 2022

Related U.S. Application Data

(63) Continuation of application No. 16/695,493, filed on Nov. 26, 2019, now Pat. No. 11,388,854.

(30) Foreign Application Priority Data

Dec. 3, 2018 (CA) .................................. 3026124

(51) Int. Cl.
*A01C 7/08* (2006.01)
*A01C 7/06* (2006.01)
*A01C 7/16* (2006.01)

(52) U.S. Cl.
CPC ............. *A01C 7/082* (2013.01); *A01C 7/06* (2013.01); *A01C 7/16* (2013.01)

(58) Field of Classification Search
CPC .......... A01C 7/082; A01C 7/081; A01C 7/08; A01C 7/00; A01C 7/06; A01C 7/16
See application file for complete search history.

(56) References Cited

U.S. PATENT DOCUMENTS

| 5,915,312 A | 6/1999 | Meyer et al. |
| 6,298,797 B1 | 10/2001 | Mayerle et al. |
| 6,688,244 B1 | 2/2004 | Meyer et al. |

(Continued)

FOREIGN PATENT DOCUMENTS

CA 2219230 4/1999

OTHER PUBLICATIONS

Canadian Office Action dated Dec. 17, 2019 for Application No. CA 3,026,124, 5 pgs.

*Primary Examiner* — Christopher J. Novosad
(74) *Attorney, Agent, or Firm* — Frost Brown Todd LLP; Nicole M. Tepe

(57) ABSTRACT

An agricultural product distribution apparatus includes a primary product container mounted on a product cart and a secondary product container. A metering device and a primary inductor assembly are mounted to the primary product container and a control system controls dispensing of products from the primary product container either through the metering device directly to furrow openers, or through the inductor assembly to the secondary product container and then through a secondary inductor assembly to downstream singulating meters. The secondary product container can be mounted on the implement frame or the product cart. A plurality of primary product containers can be mounted on the product cart each with a metering device and primary inductor assembly such that each tank can dispense through either of the corresponding metering devices or primary inductor assemblies.

8 Claims, 5 Drawing Sheets

(56) References Cited

U.S. PATENT DOCUMENTS

Figure 1:
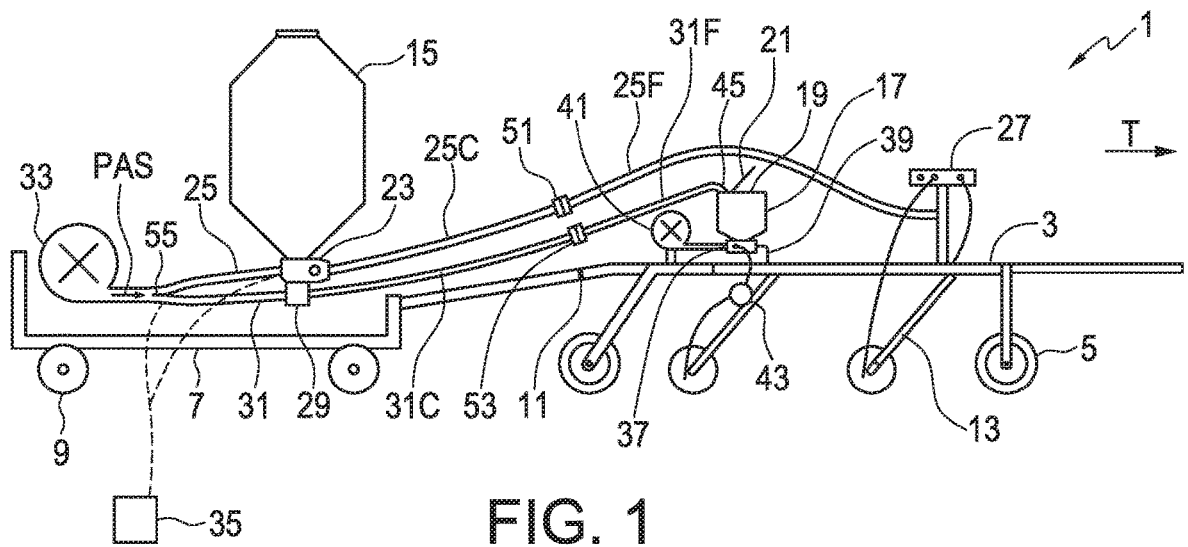

| | | |
|---|---|---|
| 7,140,310 B2 | 11/2006 | Mayerle et al. |
| 7,966,954 B2 | 6/2011 | Anderson et al. |
| 8,408,478 B2 | 4/2013 | Wonderlich |
| 8,683,930 B2 | 4/2014 | Cresswell |
| 9,439,344 B2 | 9/2016 | Connors et al. |
| 9,814,173 B2 | 11/2017 | Frasier et al. |
| 9,980,428 B2 | 5/2018 | Long et al. |
| 10,045,478 B2 | 8/2018 | Posselius |
| 2004/0163578 A1 | 8/2004 | McDonald |
| 2005/0103244 A1 | 5/2005 | Mayerle et al. |
| 2006/0162630 A1 | 7/2006 | Fuessel |
| 2006/0243179 A1 | 11/2006 | Landphair |
| 2010/0313800 A1 | 12/2010 | Anderson et al. |
| 2014/0190980 A1 | 7/2014 | Long et al. |
| 2014/0193211 A1 | 7/2014 | Connors et al. |
| 2017/0086352 A1 | 3/2017 | Frasier et al. |
| 2017/0086355 A1 | 3/2017 | Borkgren et al. |
| 2017/0318737 A1 | 11/2017 | Gilstring |
| 2017/0320422 A1 | 11/2017 | Roberge |
| 2019/0346302 A1 | 11/2019 | Nedved et al. |
| 2019/0364720 A1 | 12/2019 | Gamer |

SELECTABLE METER OR INDUCTOR FEED FOR SEEDS

CROSS-REFERENCE TO RELATED APPLICATION

This application claims priority to and benefit of U.S. patent application Ser. No. 16/695,493, filed Nov. 26, 2019, which claims priority to and benefit of CA Serial No. 3,026,124, filed Dec. 3, 2018, the contents of which are incorporated by reference in their entirety for all purposes.

FIELD OF THE INVENTION

This disclosure relates to the field of agricultural implements and in particular a seeding apparatus with an inductor system feeding a plurality of singulating meters.

BACKGROUND

Agricultural seeding implements for crops such as corn, soybeans, and the like typically include a singulating meter that is operative to dispense seeds individually into a furrow formed in the soil surface by a furrow opener. In the past each singulating meter included a seed container mounted above each singulating meter to supply seed to the meter by gravity. Early designs required each seed container to be filled individually, a time consuming process. More recently inductor systems have been developed where an air stream carries seeds from a single nurse tank to the seed container above each meter, or to a small seed container defined in the singulating meter itself.

The metering function is carried out by the singulating meters, and the inductor systems are only required to ensure that a supply of seeds is maintained available to each singulating meter. Thus in a typical inductor system seeds flow from the nurse tank down into an inductor box and an air stream directed into the inductor box picks up seeds and carries them through a plurality of seed conduits to a like plurality of seed containers, each corresponding to a singulating meter. The seed containers include an air release assembly, such as a screen.

As seeds entrained in an air stream move into a seed container, the air is released through the screen and the seeds drop into the seed container. The level of seeds in the seed container rises as the seed container fills, and moves up along the screen reducing the area of screen available for the air to pass through such that pressure builds in the seed container and eventually the pressure in the seed container is such that the volume and velocity of the air stream entering the seed container is reduced to a point where the air stream no longer is sufficient to pick up seeds from the inductor box. Seeds that are in the seed conduit fall out of the air stream as well. The level of seeds in the seed container falls as the seeds are metered out by the corresponding singulating meter, exposing an increasing area of screen, and the volume and velocity of the air stream increases to a point where same is sufficient to again pick up seeds from the inductor box and also pick up those seeds that have fallen to the bottom of the seed conduit. U.S. Pat. No. 6,688,244 to Meyer et al. and United States Published Patent Application Number 2017/0318737 of Gilstring for example disclose inductor systems.

United States Published Patent Application Number 2017/0086355 of Borkgren et al. discloses a seed distribution system where seeds are metered and conveyed from the air seeder tank to a remote pick-up assembly comprising a housing with a plurality of outlets arrayed along opposite upright side walls of the housing, each outlet connected to a seed conduit to carry seeds to downstream seed containers. The seeds and air stream are separated at an inlet to the housing, and the seeds fall down an interior of the housing and the air stream is redirected into the housing where same picks-up and entrains the seeds again and passes along each seed conduit.

U.S. Pat. No. 5,915,312 to Meyer et al. discloses modifying a bin with an existing metering system by removing the metering device, and inserting an inductor device having plenum and tube structures into the opening to transfer seeds out of the bin with an air stream and through a plurality of hoses to a corresponding plurality of meters.

U.S. Pat. No. 6,298,797 Mayerle et al. discloses converting an air seeder meter box into a nurse inductor box by detachably mounting an inductor box on the meter box to receive a supply of seed particles therefrom and convey the seeds into a plurality of distribution lines to remote planting mechanisms.

U.S. Pat. No. 8,683,930 to Cresswell discloses an air seeder cart which includes a plurality of conventional large containers for agricultural products and also a smaller container with a fill opening that is conveniently located for depositing agricultural products into the container manually.

BRIEF SUMMARY

The present disclosure provides an agricultural product distribution apparatus and method that overcomes problems in the prior art.

In a first embodiment the present disclosure provides an agricultural product distribution apparatus for an air seeder comprising an implement frame mounted on frame wheels. A product cart is mounted on cart wheels and is releasably connected to the implement frame, and a primary product container is mounted on the product cart. A metering device is mounted to the primary product container and is configured to receive products from the primary product container and meter the products into a meter air conduit connected through a downstream distribution network to a plurality of furrow openers mounted on the implement frame. A primary inductor assembly is mounted to the primary product container and is configured to receive products from the primary product container and direct the products into a demand air conduit connected to a secondary product container. A pressurized primary air source is operative to generate a primary air stream. A control system is operative, while in a metering mode, to direct a meter portion of the primary air stream into the meter air conduit and to direct products from the primary product container into the metering device where the products are metered into the meter portion of the primary air stream flowing through the meter air conduit and carried through the downstream distribution network to the plurality of furrow openers. The control system is further operative, while in a demand mode, to direct a demand portion of the primary air stream into the demand air conduit and to direct products from the primary product container into the primary inductor assembly where the products are entrained in the demand portion of the primary air stream flowing through the demand air conduit and carried into the secondary product container. A secondary inductor assembly is mounted to the secondary product container and a plurality of product conduits is connected to the secondary inductor assembly, and a pressurized secondary air source is operative to direct a secondary air stream into the secondary inductor assembly to entrain products from the secondary product container into the secondary air stream and convey the products downstream through the plurality of product conduits.

In a second embodiment the present disclosure provides a method of seeding first crop seeds in a first field surface and second crop seeds in a second field surface. The method comprises mounting an implement frame on frame wheels, and mounting a plurality of furrow opener assemblies on the implement frame; mounting a product cart on cart wheels and releasably connecting the product cart to the implement frame; mounting a primary product container on the product cart; mounting a metering device to the primary product container; mounting a primary inductor assembly to the primary product container; controlling a flow of seeds from the primary product container to direct the flow of seeds into a selected one of the metering device and the primary inductor assembly; mounting a secondary product container on a selected one of the product cart and the implement frame; mounting a secondary inductor assembly to the secondary product container and connecting a plurality of product conduits between the secondary inductor assembly and a corresponding plurality of singulating meters; generating a primary air stream; seeding the first crop seeds by depositing the first crop seeds into the secondary product container, generating a secondary air stream and directing the secondary air stream into the secondary inductor assembly, moving the implement frame along the first field surface with first selected furrow opener assemblies engaging the first field surface, directing the first crop seeds from the secondary product container into the secondary inductor assembly such that the first crop seeds are entrained in the secondary air stream and carried through the product conduits to the singulating meters and the singulating meters dispense the first crop seeds to the first selected furrow opener assemblies; seeding the second crop seeds by depositing the second crop seeds into the primary product container, directing a meter portion of the primary air stream through a meter air conduit connected to second selected furrow opener assemblies, moving the implement frame and connected product cart along the second field surface with the second selected furrow opener assemblies engaging the second field surface, directing the second crop seeds from the primary product container to the metering device and metering the second crop seeds into the meter air conduit such that the second crop seeds are carried to the second selected furrow opener assemblies.

The present disclosure thus provides a product distribution apparatus for an air seeder and method of seeding first crop seeds in a first field surface and second crop seeds in a second field surface that provides considerable versatility by allowing the primary seed container to be quickly and simply converted to dispense seeds, fertilizer or like agricultural products directly to furrow openers with a metering device, or to supply agricultural products, typically seeds to a plurality of singulating meters using an inductor assembly and demand air conduit.

The inductor assembly is simple and cost effective such that where, as is typical, a plurality of primary product containers is mounted on the product cart, an inductor assembly can be economically mounted to each primary product container. Each primary product container can then be configured to dispense products through the metering device or the inductor assembly allowing for the most efficient use of the various sized primary product containers to minimize the stops needed to refill. Thus the products from any of the primary product containers can be transferred to the secondary product container and product distribution to the singulating meters is carried out at the secondary product container instead of requiring product distribution from each primary product container.

The secondary product container can include a sealable fill opening and may be mounted on the implement frame or the product cart, and can be located where it is convenient to add products manually if desired. Products are supplied to the secondary product container by the primary inductor assembly. Where the secondary product container is mounted on the implement frame such that product distribution to the singulating meters takes place on the implement frame, this transfer of product by induction results in only a single demand air conduit extending between the product cart and the implement frame.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 1 is a schematic side view of an embodiment of the product distribution apparatus of the present disclosure where the secondary product container is mounted on the implement frame;

FIG. 2 is a schematic top view of the embodiment of FIG. 1;

FIG. 3 is a schematic sectional end view of the metering device and primary inductor assembly attached to the bottom of the primary product container of the embodiment of FIG. 1;

FIG. 4 is a schematic sectional side view of the metering device and primary inductor assembly shown in FIG. 3;

FIG. 5 is a schematic sectional side view of the diversion plate of the embodiment of FIG. 1;

FIG. 6 is a schematic top view of an alternate embodiment of the product distribution apparatus of the present disclosure where the secondary product container is mounted on the product cart;

FIG. 7 is a schematic top view of an alternate product cart of the present disclosure where three primary product containers as well as the secondary product container are mounted on the product cart, and where the primary product containers have been removed from the drawing to more clearly show how each primary product container can dispense products through either a metering device or a primary inductor assembly;

FIG. 8 is a schematic side view of the product cart of FIG. 7 with the primary product containers shown in place;

FIG. 9 is a schematic perspective view of an alternate demand air conduit with an operating path through the inductor box and a bypass path;

FIG. 10 is a schematic perspective view of a further alternate demand air conduit with an operating path through the inductor box and a shorter more direct bypass path that passes through the primary inductor assembly;

FIG. 11 is a schematic sectional side view of the demand air conduit of FIG. 10 with the valve plate inserted to block flow through the bypass path.

DETAILED DESCRIPTION OF THE ILLUSTRATED EMBODIMENTS

FIGS. 1 and 2 schematically illustrate an embodiment of a product distribution apparatus 1 of the present disclosure for an air seeder. The apparatus 1 comprises an implement frame 3 mounted on frame wheels 5, and a product cart 7 mounted on cart wheels 9 and releasably connected to the implement frame 3 at a hitch assembly 11 such that when connected the implement frame and product cart move in the operating travel direction T together. A plurality of furrow openers 13 are spaced across a width of the implement frame 3.

A primary product container 15 is mounted on the product cart 7 and a secondary product container 17 is mounted on either the implement frame 3 or the product cart 7. In the illustrated apparatus 1 the secondary product container 17 is mounted on the implement frame 3 and includes a fill opening 19 and a releasable cover 21 operative to seal the fill opening 19.

A metering device 23 is mounted to the primary product container 15 and is configured to receive products from the primary product container 15 and meter the products into a meter air conduit 25 connected through a downstream distribution network 27 to a plurality of furrow openers 13 mounted on the implement frame 3. A primary inductor assembly 29 is also mounted to the primary product container 15 and is configured to receive products from the primary product container 15 and direct the products into a demand air conduit 31 connected to the secondary product container 17.

A pressurized primary air source 33, schematically illustrated as a fan, is operative to generate a primary air stream PAS. A control system 35 is operative while in a metering mode to direct a meter portion PASM of the primary air stream PAS into the meter air conduit 25 and to direct products from the primary product container 15 into the metering device 23 where the products are metered into the meter portion PASM of the primary air stream PAS flowing through the meter air conduit 25 and the products are carried through the downstream distribution network 27 to the plurality of connected furrow openers 13.

Figure 2:
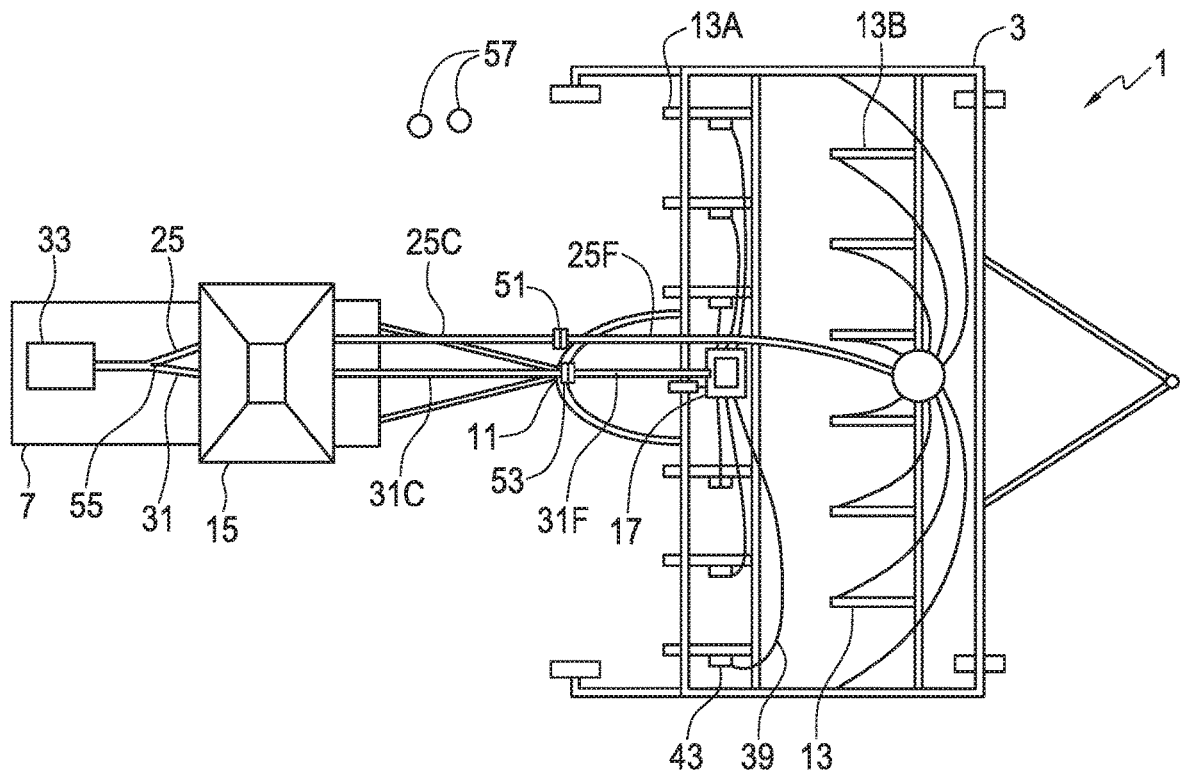

In the usual course all furrow openers 13 on the implement frame 3 would be connected to the distribution network 27, however for clarity of illustration lines are drawn in FIG. 2 connecting only those furrow openers 13 that are on the front rank of the implement frame 3.

The control system 35 is further operative while in a demand mode to direct a demand portion PASD of the primary air stream into the demand air conduit 31 and to direct products from the primary product container 15 into the primary inductor assembly 29 where the products are entrained in the demand portion PASD of the primary air stream PAS flowing through the demand air conduit 31 and carried into the secondary product container 17. The secondary product container 17 includes a screen 45 operative to release the demand air stream PASD from the secondary product container 17 to pass out into the atmosphere while the products entrained in the demand portion PASD of the primary air stream PAS remain in the secondary product container 17. As products build up in the secondary product container 17, they block the screen 45 and the rate of flow of the demand portion PASD of the primary air stream PAS drops to a point where products are no longer entrained. When the level of products drops the screen 45 becomes more exposed and the rate of flow of the demand portion PASD of the primary air stream PAS again increases to a point where products are carried into the secondary product container 17.

A secondary inductor assembly 37 is mounted to the secondary product container 17 and a plurality of product conduits 39 are connected to the secondary inductor assembly 37. A pressurized secondary air source 41, also schematically illustrated as a fan, is operative to direct a secondary air stream into the secondary inductor assembly 37 to entrain products from the secondary product container 17 into the secondary air stream and convey the products downstream through the plurality of product conduits 39. Input ends of the product conduits 39 are connected to the secondary inductor assembly 37 and an output end of each product conduit 39 is connected to a singulating meter assembly 43 configured to receive and store the products and then dispense them with a singulating meter into a furrow made by a corresponding furrow opener 13. The agricultural product delivered to the singulating meters in this way are typically seeds.

The product distribution apparatus 1 provides the advantage of distributing products stored in the primary product container 15 either with the metering device 23, typically directly through the distribution network 27 to connected furrow openers 13, or with the primary and secondary inductor assemblies 29, 37, typically to connected singulating meter assemblies 43. The metering device 23 will dispense either seeds or fertilizer or like agricultural products, while the product distributed through the primary inductor assembly 29 to the secondary product container 17 will generally be various crop seeds.

Figure 3:
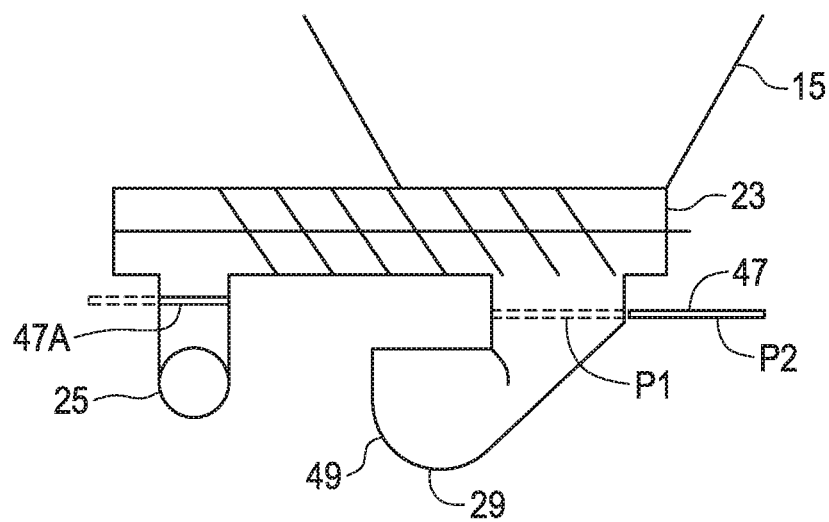
Figure 4:
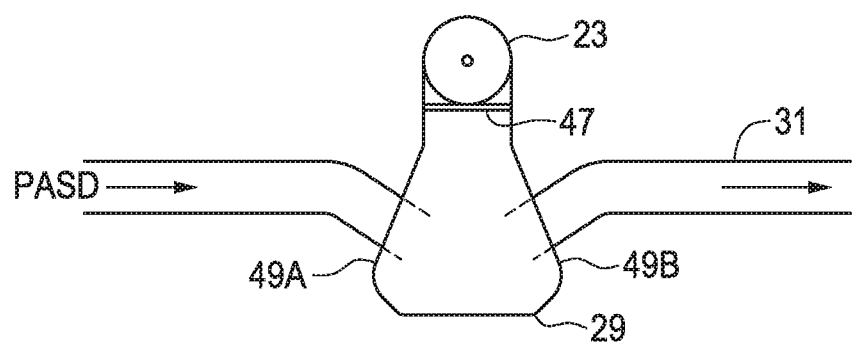

As schematically illustrated in FIGS. 3 and 4, in the apparatus 1 the metering device 23, shown here as an auger type metering device, is mounted under the primary product container 15 and the primary inductor assembly 29 is mounted under the metering device 23. The control system 35 comprises a valve 47 movable between the metering device 23 and the primary inductor assembly 29. While the control system 35 is in the metering mode the valve 47 is closed in position P1 blocking products from entering the primary inductor assembly 29 and the metering device 23 is operating, rotating to dispense products into the meter air conduit 25 carrying the meter portion PASM of the primary air stream PAS.

While the control system 35 is in the demand mode the valve 47 is open in position P2 allowing products to enter the primary inductor assembly 29 and the metering device 23 is idle, such that the products simply flow through the stationary auger into the primary inductor assembly 29 where the products are entrained in the demand portion PASD of the primary air stream PAS flowing in the demand air conduit 31. The primary inductor assembly 29 comprises an inductor box 49 and the demand air conduit 31 slopes downward into an upstream side 49A of the inductor box 49 and slopes upward from a downstream side 49B of the inductor box 49. The demand air conduit 31 thus extends through the inductor box 49 such that the inductor box 49 forms a portion of the demand air conduit 31.

Figure 5:
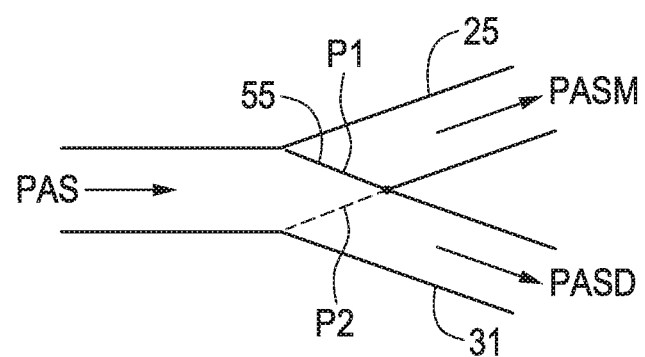

As schematically illustrated in FIG. 5, the control system 35 includes a diversion plate 55 that is moved, when the control system 35 is in the demand mode, to position P1 to direct the primary air stream PAS into the demand air conduit 31, and that is moved, when the control system 35 is in the metering mode, to position P2 to direct the primary air stream PAS into the meter air conduit 25.

In the apparatus 1 where only a single primary product container 15 is present the control system 35 with diversion plate 55 will typically divert the whole of the primary air stream PAS into either the meter air conduit 25 or the demand air conduit 31, however as described below in the common situation where a plurality of primary product containers are present the, the diversion plate 55 can be moved to an intermediate position where the primary air stream PAS will be divided into the meter and demand portions PASM, PASD so that while seeds are being inducted through the demand air conduit 31 from one primary product container, fertilizer at the same time can be metered and carried through the meter air conduit 25. The pressurized primary air source 33 could also comprise a plurality of fans connected to the meter and demand air conduits 25, 31. Where convenient as well the pressurized secondary air source could be provided by the pressurized primary air source 33 rather than be a separate fan 41, especially when the secondary product container 17 is mounted on the product cart 7. Then the pressurized primary air source 33 generates the primary air stream PAS and the secondary air stream.

Where all the primary air stream PAS is flowing in the demand air conduit 31 through the inductor assembly 29 as shown in FIG. 3, with no air flowing in the meter air conduit 25 a significant pressure differential will be present between the inductor assembly 29 and the meter air conduit 25. Similarly, but to a lesser degree, when a meter portion PASM of the primary air stream PAS is flowing through the meter air conduit 25 and a demand portion PASD of the primary air stream PAS is flowing through the demand air conduit 31 there can be pressure differentials that cause air flow between the meter and demand air conduits 25, 31 through the metering device 23. In order to prevent leakage of air through the metering device 23 an air valve 47A can be moved to block the flow of air when the corresponding inductor assembly 29 is operative.

Mounting the secondary product container 17 on the implement frame 3 allows the apparatus 1 to operate without the product cart 7. Where product application rates are quite low it may be desirable in some field operations where increased maneuverability is desired to disconnect the product cart and fill the secondary product container 17 with products manually through the available fill opening 19 with its releasable cover 21.

In the illustrated apparatus 1 then the meter air conduit 25 comprises a meter cart portion 25C mounted on the product cart 7 and a meter frame portion 25F mounted on the implement frame 3. A releasable meter connector 51 is operative to connect an output end of the meter cart portion 25C to an input end of the meter frame portion 25F.

Similarly the demand air conduit 31 comprises a demand cart portion 31C mounted on the product cart 7 and a demand frame portion 31F mounted on the implement frame 3. A releasable demand connector 53 is operative to connect an output end of the demand cart portion to an input end of the demand frame portion. To prevent contamination seals 57 are provided operative to releasably seal the input ends of the frame portions of the meter and demand air conduits 25F, 31F.

Figure 6:
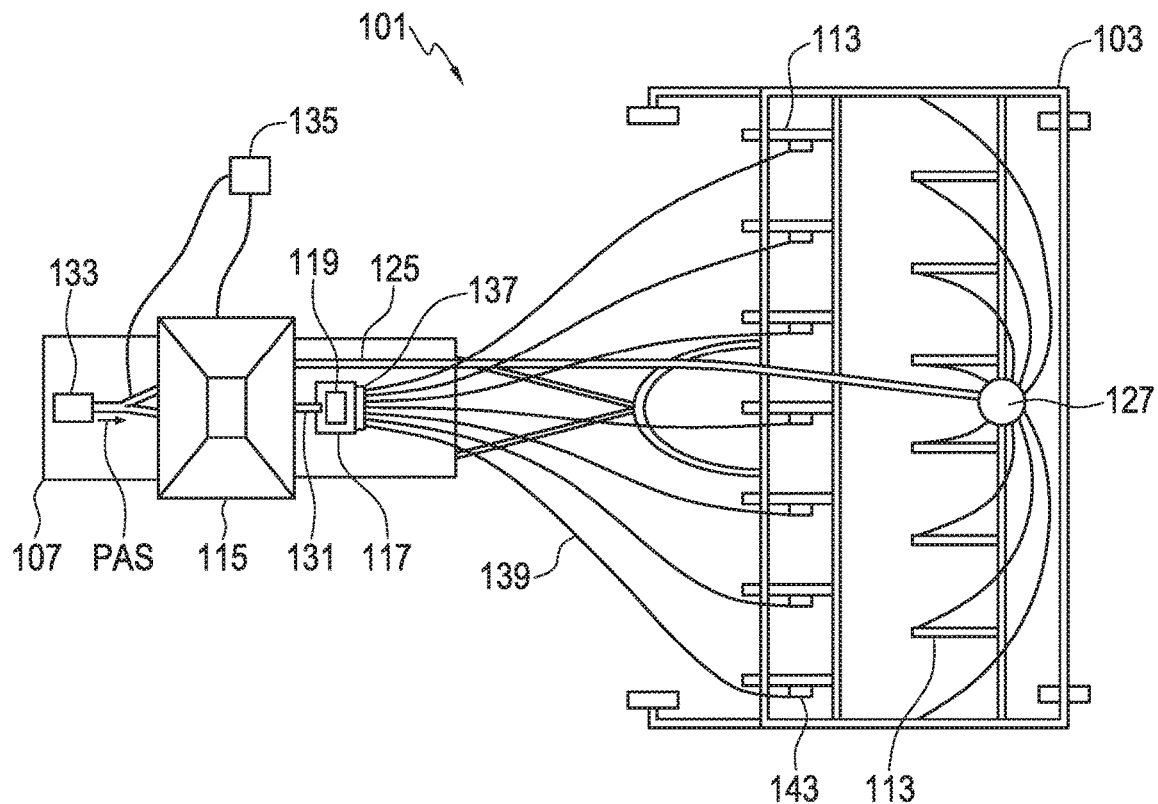

FIG. 6 schematically illustrates an alternate embodiment of the apparatus 101 where the secondary product container 117 is mounted on the product cart 107. While in the metering mode the control system 135 again directs the meter portion PASM of the primary air stream PAS from the pressurized primary air source 133 into the meter air conduit 125 and to direct products from the primary product container 115 into the metering device where the products are metered into the meter portion PASM of the primary air stream PAS flowing through the meter air conduit 125 and the products are carried through the downstream distribution network 127 to the plurality of connected furrow openers 113.

While in the demand mode the control system 135 again directs the demand portion PASD of the primary air stream PAS from the pressurized primary air source 133 into the demand air conduit 131 and the control system 135 directs products from the primary product container 115 into the primary inductor assembly where the products are entrained in the demand portion PASD of the primary air stream PAS flowing through the demand air conduit 131 and the products are carried the short distance into the secondary product container 117 that is mounted on the product cart 107 along with the primary product container 115. The product conduits 139 are connected between the secondary inductor assembly 137 under the secondary product container 117 on the product cart 107 and the singulating meter assemblies 143 mounted on the implement frame 103.

These product conduits 139 would also typically have releasable connectors between the product cart 107 and the implement frame 103 to facilitate disconnecting the product cart 107 from the implement frame 103. Typically output ends of cart portions of each product conduit 139 would be connected to a first section of a connector assembly and input ends of frame portions of each product conduit 139 would be connected to a second section of the connector assembly, and the first and second sections would be releasably connectable.

In contrast to mounting the secondary product container 17 on the implement frame 3 as in FIG. 2, mounting the secondary product container 117 on the product cart 107 can be more convenient for typical seeding operations. For example when seeding rates are low it may be more convenient to load seeds manually into the fill opening 119 of the secondary product container 117. The secondary product container 117 can be quite small relative to the usual plurality of large primary product containers present on a typical product cart, and can be located at a low elevation for more convenient manual loading compared to using one of the primary product containers which require typically carrying bags of seeds up a ladder or using a lift device or the like. In such a situation the primary product container may not be used at all.

The same apparatus 101 however can also provide benefits where the seeding rate is quite high by allowing small quantities of seeds to be added manually to the secondary product container 117, for example to reduce clean out time and labor when finishing one crop and readying the apparatus for switching to seed a different crop.

Figure 7:
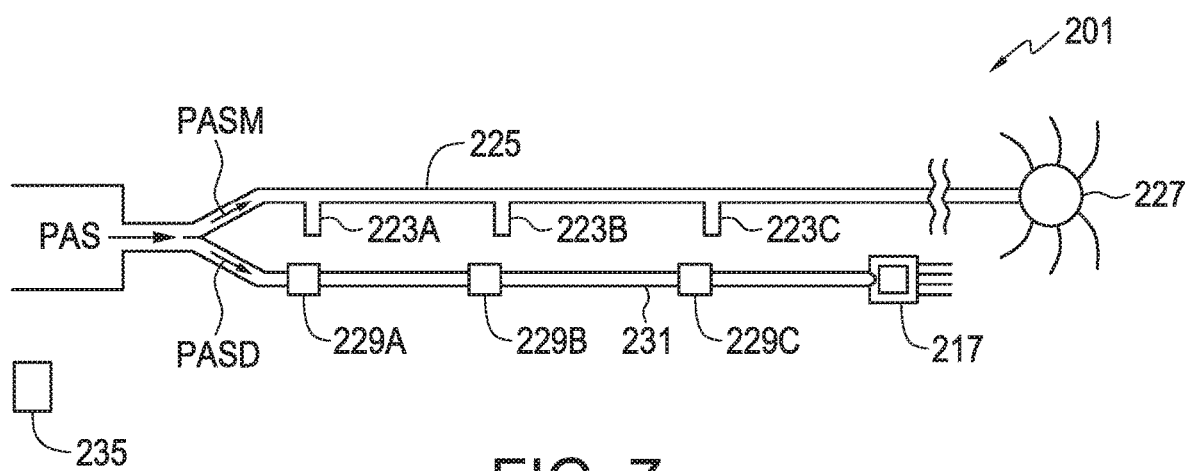
Figure 8:
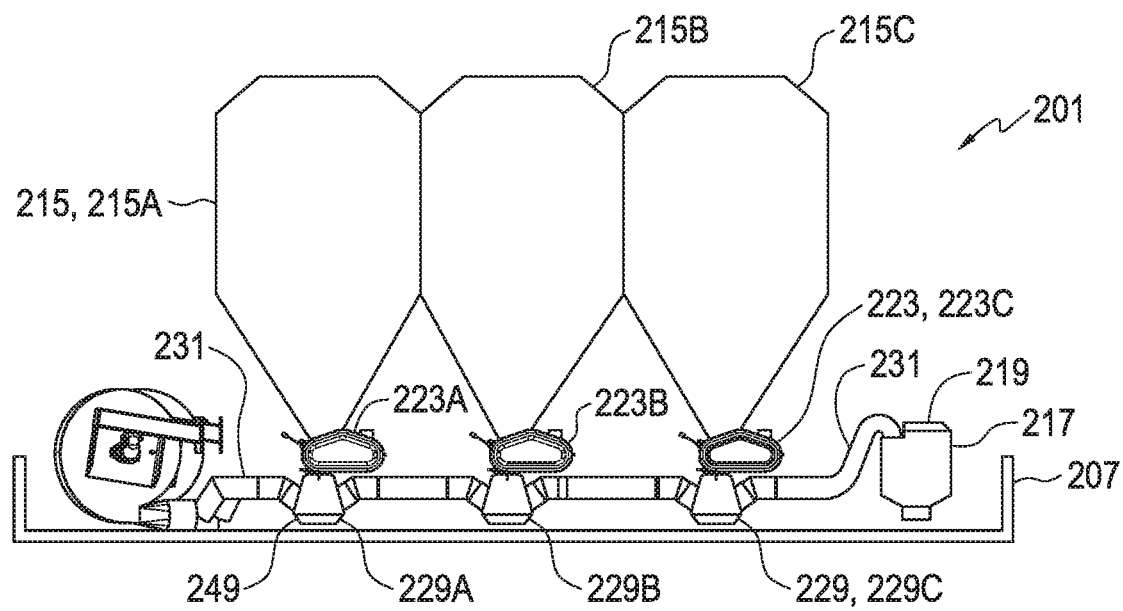

The apparatuses 1, 101 are simplified schematics showing a product cart with only one primary product container 15, 115 while in a typical product cart three or more primary product containers are mounted on the product cart as schematically illustrated in the apparatus 201 of FIGS. 7 and 8. Each primary product container 215A, 215B, 215C has a corresponding metering device 223A, 223B, 223C and corresponding primary inductor assembly 229A, 229B, 229C mounted to receive products from the primary product containers when a control system is in a metering or demand mode as described above. The secondary product container 217 is also shown mounted on the product cart 207 at a convenient location with the fill opening 219 at a much lower location than fill openings for the primary product containers 215.

In a common operation products, typically seeds, will be inducted from only one of the primary product containers 215 at a time and agricultural products such as fertilizer, chemicals, and the like will be metered from the other primary product containers 215. The arrangement shown in FIGS. 7 and 8 does however provide considerable versatility in that products may be inducted from any one of the primary product containers 215, which typically vary in size, such that application rates and capacities can be selected to reduce down time required for filling the primary product container with seeds and other agricultural products.

In the apparatus 201 the control system 235 is operative while in a first metering mode to direct the meter portion PASM of the primary air stream into the meter air conduit 225 and to direct products from the first primary product container 215A into the first metering device 223A where the products are metered into the meter portion PASM of the primary air stream flowing through the meter air conduit 225 and carried through the downstream distribution network 227.

The control system is operative while in a first demand mode to direct the demand portion PASD of the primary air stream into the demand air conduit 231 and to direct products from the first primary product container 215A into the first primary inductor assembly 229A where the products are entrained in the demand portion PASD of the primary air stream flowing through the demand air conduit 231 and carried to the secondary product container 217.

Similarly the control system 235 is operative while in a second metering mode to direct the meter portion PASM of the primary air stream into the meter air conduit 225 and to direct products from the second primary product container 215B into the second metering device 223B where the products are metered into the meter portion PASM of the primary air stream flowing through the meter air conduit 225 and carried through the downstream distribution network 227, and the control system 235 is operative while in a second demand mode to direct the demand portion PASD of the primary air stream into the demand air conduit 231 and to direct products from the second primary product container 215B into the second primary inductor assembly 229B where the products are entrained in the demand portion PASD of the primary air stream flowing through the demand air conduit 231 and carried to the secondary product container 217.

Thus the control system 235 can move product from the first primary product container 215A either by metering or by induction, and can move product from the second primary product container 215B either by metering or by induction. Although not specifically described the control system 235 can move product from the third primary product container 215C either by metering or by induction.

To allow application of seed and other agricultural products such as various fertilizers and chemicals at the same time the control system 235 is operative while in a combined first metering mode and second demand mode to direct the meter portion PASM of the primary air stream into the meter air conduit 225 and to direct products from the first primary product container 215A into the first metering device 223A where the products are metered into the meter portion PASM of the primary air stream flowing through the meter air conduit 225 and through the distribution network 227, and the control system is operative to direct the demand portion PASD of the primary air stream into the demand air conduit 231 and to direct products from the second primary product container 215B into the second primary inductor assembly 229B where the products are entrained in the demand portion PASD of the primary air stream flowing through the demand air conduit 231 and carried to the secondary product container 217 for further distribution.

In the apparatus 201 of FIGS. 7 and 8 the inductor assemblies 229 each comprise a corresponding inductor box 249, and the demand air conduit 231 simply extends through each inductor box, as shown in FIG. 4, such that the inductor boxes 249 form a portion of the demand air conduit 231. In this arrangement the demand portion PASD of the primary air stream will meet significant resistance as it passes through the ups and downs and changes in conduit size present in each inductor box 249.

Figure 9:
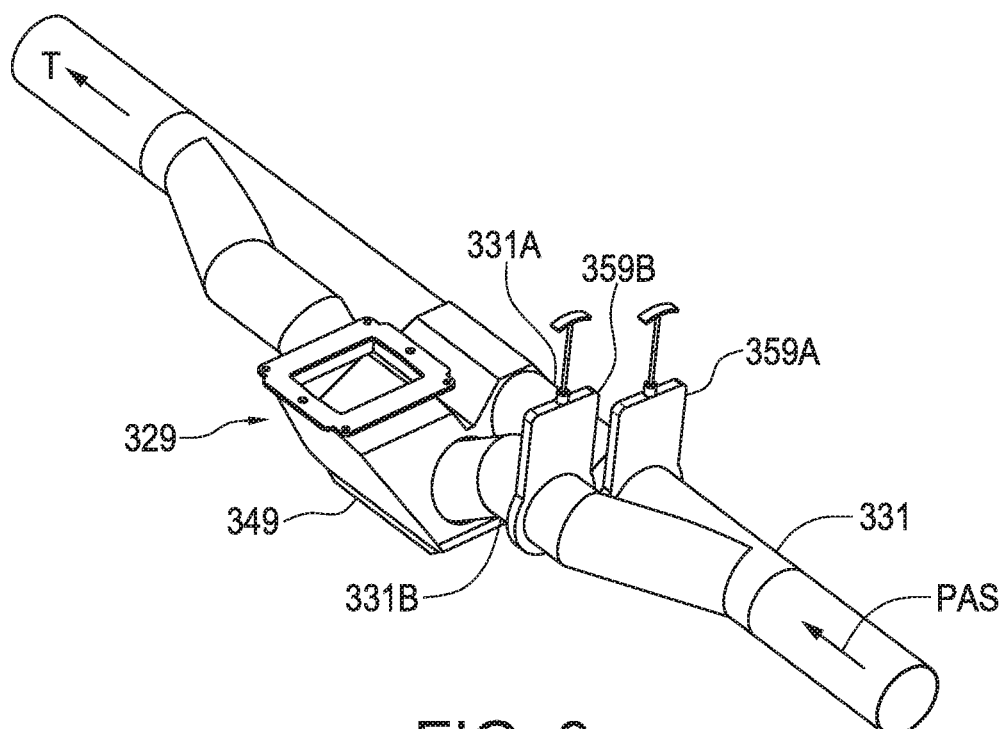
Figure 10:
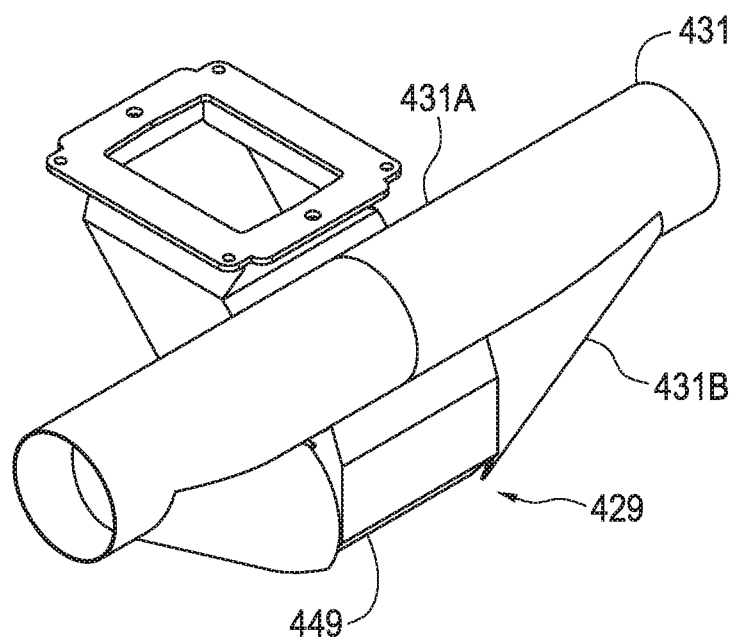
Figure 11:
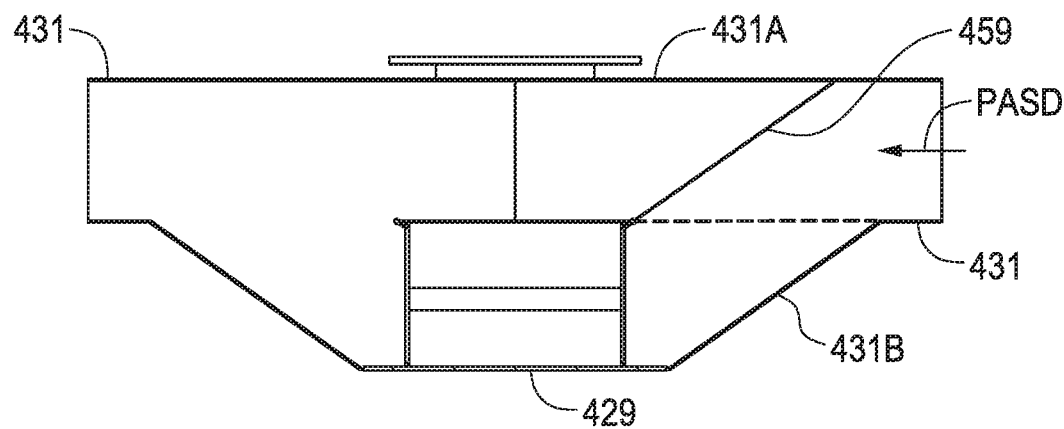

FIG. 9 schematically illustrates an alternate demand air conduit 331 that reduces the resistance to air flow and increases efficiency. At each primary inductor assembly 329 the demand air conduit 331 comprises a bypass path 331A that bypasses the inductor box 349 and an operating path 331B that includes the inductor box 349. Where a primary product container to which the inductor box is mounted is selected, the bypass path 331A is closed, such as by inserting the valve plate 359A, and the demand portion PASD of the primary air stream PAS flows through the operating path 331B. In unselected primary product containers where induction is not desired the demand portion PASD of the primary air stream PAS flows through the bypass path 331A.

In FIG. 9 the major length of the demand air conduit 331 extends along the product cart generally under the primary product containers in a substantially straight orientation aligned with an operating travel direction T of the product cart. At each inductor box 349 the bypass path 331A is aligned with the straight major length of the demand air conduit 331 and the operating path 331B is oriented at an angle to the bypass path 331A and the major length of the demand air conduit 331. In the arrangement shown in FIG. 9 when a primary inductor assembly 329 is inoperative and the valve plate 359A is withdrawn, the demand portion PASD of the primary air stream flows through both the bypass path 331A and the operating path 331B, considerably reducing the resistance to air flow through the demand air conduit 331.

A further valve plate 359B could be added in the operating path 331B to close the operating path 331B when the when the corresponding primary inductor assembly 329 is inoperative. The valves 359A, 359B could also be moved to intermediate positions where a selected proportion of the demand portion PASD of the primary air stream flows through each of the bypass path 331A and the operating path 331B. Maintaining some air flow in the bypass path 331A reduces the risk of plugging.

The bypass channel 331A is aligned with the major length of the demand air conduit 331 and so air flow, and seed flow, through the bypass channel 331A will generally be greater than air flow and seed flow through the operating channel 331B when the demand portion PASD of the primary air stream PAS passes through downstream inductor boxes 349 after picking up seeds in an upstream inductor box. Thus fewer seeds will be carried through these downstream inductor boxes and come in contact with inductor box walls which can damage the seeds, and so seed damage is reduced as well.

FIGS. 10 and 11 schematically illustrate a further alternate demand air conduit 431 that reduces the resistance to air flow and increases efficiency. At each primary inductor assembly 429 the demand air conduit 431 comprises a bypass path 431A, that passes straight through the inductor assembly 429 but with no opening to the inductor box 449 thus effectively bypassing the inductor box 449, and an operating path 431B that includes the inductor box 449. When a primary inductor assembly 429 is operative, the valve plate 459 is inserted as shown in FIG. 11 to block the bypass path 431A and the demand portion PASD of the primary air stream PAS flows through the operating path 431B entraining seed and carrying same downstream through the demand air conduit 431. The valve plate 459 could also be configured such that when a primary inductor assembly 429 is inoperative, the valve plate 459 is moved to block the entrance to the operating path 431B such that the full demand portion PASD of the primary air stream PAS passes through the bypass path 431A.

The present disclosure further discloses a method of seeding first crop seeds in a first field surface and second crop seeds in a second field surface. The method comprises mounting an implement frame 3 on frame wheels 5, and mounting a plurality of furrow opener assemblies 13 on the implement frame 3; mounting a product cart 7 on cart wheels 9 and releasably connecting the product cart 7 to the implement frame 3; mounting a primary product container 15 on the product cart 7; mounting a metering device 23 to the primary product container 15; mounting a primary inductor assembly 29 to the primary product container 15; controlling a flow of products from the primary product container 15 to direct the flow of products into a selected one of the metering device 23 and the primary inductor assembly 29; mounting a secondary product container 17 on a selected one of the product cart 7 and the implement frame 3; mounting a secondary inductor assembly 37 to the secondary product container 17 and connecting a plurality of product conduits 39 between the secondary inductor assembly 37 and a corresponding plurality of singulating meters 43; generating a primary air stream PAS; seeding the first crop seeds by depositing the first crop seeds into the secondary product container 17, generating a secondary air stream and directing the secondary air stream into the secondary inductor assembly 37 with the fill opening 19 sealed, moving the implement frame 3 along the first field surface with first selected furrow opener assemblies 13A engaging the first field surface, and directing the first crop seeds from the secondary product container 17 into the secondary inductor assembly 37 such that the first crop seeds are entrained in the secondary air stream and carried through the product conduits 39 to the singulating meters 43 and the singulating meters 43 dispense the first crop seeds to the first selected furrow opener assemblies 13A; seeding the second crop seeds by depositing the second crop seeds into the primary product container 15, directing a meter portion PASM of the primary air stream PAS through a meter air conduit 25 connected to second selected furrow opener assemblies 13B, moving the implement frame 3 and connected product cart 7 along the second field surface with the second selected furrow opener assemblies 13B engaging the second field surface, and directing the second crop seeds from the primary product container 15 to the metering device 23 and metering the second crop seeds into the meter air conduit 25 such that the second crop seeds are carried to the second selected furrow opener assemblies 13B.

The method typically further comprises, with the product cart 7 connected to the implement frame 3, depositing the first crop seeds into the secondary product container 17 by depositing the first crop seeds into the primary product container 15 and directing a demand portion PASD of the primary air stream PAS through a demand air conduit 31 connected between the primary inductor assembly 29 and the secondary product container 17, and directing the first crop seeds from the primary product container 15 to the primary inductor assembly 29 where the first crop seeds are entrained in the demand portion PASD of the primary air stream PAS in the demand air conduit 31 and transferred into the secondary product container 17.

The method can comprise providing a fill opening 19 in an upper portion of the secondary product container 17 with a releasable cover 21 operative to seal the fill opening 19. Where it is desired to add only a small amount of first crop seeds to the secondary product container 17 these additional first crop seeds can be deposited into the secondary product container 17 through the fill opening 19. This can be advantageous for example when seeding the first crop seeds is almost complete and only a small additional amount of first seeds is required.

The method can comprise mounting the secondary product container 17 on the implement frame 3 and with the product cart 7 disconnected from the implement frame 3, depositing the first crop seeds into the secondary product container 17 through the fill opening 19 and moving the implement frame 3 along the first field surface without the product cart 7. This method can be used for example where the seeding rate is low and where added maneuverability of the air seeder is desired, such as where the first field is odd shaped requiring considerable tight turns. Using this method then the output end of the cart portion 31C of the demand air conduit 31 that is mounted on the product cart 7 is disconnected from an input end of the frame portion 31F of the demand air conduit 31 that is mounted on the implement frame 3, and the input end of the frame portion 31F of the demand air conduit 31 is sealed.

The method can comprise mounting the secondary product container 17 on the product cart 7 and, with the product cart 7 connected to the implement frame 3, depositing the first crop seeds into the secondary product container 17 by depositing the first crop seeds into the primary product container 15 and directing the demand portion PASD of the primary air stream PAS through the demand air conduit 31 connected between the primary inductor assembly 29 and the secondary product container 17, and directing the first crop seeds from the primary product container 15 to the primary inductor assembly 29 where the first crop seeds are entrained in the demand portion PASD of the primary air stream PAS in the demand air conduit 31 and transferred into the secondary product container 17. Additional first crop seeds can also be deposited into the secondary product container 17 through the fill opening 19.

The method can further comprise mounting first and second primary product containers 215A, 215B on the product cart 207; mounting corresponding first and second metering devices 223A, 223B to the corresponding first and second primary product containers 215A, 215B; mounting corresponding first and second primary inductor assemblies 229A, 229B to the corresponding first and second primary product containers 215A, 215B; controlling a flow of seeds from the first primary product container 215A to direct the flow of seeds into a selected one of the first metering device 223A and the first primary inductor assembly 229A; and controlling a flow of seeds from the second primary product container 215B to direct the flow of seeds into a selected one of the second metering device 223B and the second primary inductor assembly 229B.

The present disclosure thus provides an agricultural product distribution apparatus for an air seeder and method of seeding first crop seeds in a first field surface and second crop seeds in a second field surface that provides considerable versatility by allowing the primary product container 15 to be quickly and simply converted to dispense products directly to furrow openers 13 with a metering device 23, or to supply products to a plurality of singulating meters using an inductor assembly 29 and demand air conduit 31.

The secondary product container 17 can include a sealable fill opening 19 and may be mounted on the implement frame 3 or the product cart 7, and can be located where it is convenient to add products manually if desired. Products are supplied to the secondary product container 17 by the primary inductor assembly 29. Where the secondary product container 17 is mounted on the implement frame 3 such that product distribution to the singulating meters 43 takes place on the implement frame 3, this transfer of product by induction results in only a single demand air conduit extending between the product cart 7 and the implement frame 3.

Where, as is typical, a plurality of primary product containers 215 is mounted on the product cart 207, each can be configured to dispense products through the metering device 223 or the inductor assembly 229 allowing for the most efficient use of the various sized primary product containers 215 to minimize the stops needed to refill.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A method of seeding first crop seeds in a first field surface and second crop seeds in a second field surface, the method comprising:
   mounting an implement frame on frame wheels, and mounting a plurality of furrow opener assemblies on the implement frame;
   mounting a product cart on cart wheels and releasably connecting the product cart to the implement frame;
   mounting a primary product container on the product cart;
   mounting a metering device to the primary product container;
   mounting a primary inductor assembly to the primary product container;
   controlling a flow of seeds from the primary product container to direct the flow of seeds into a selected one of the metering device and the primary inductor assembly;
   mounting a secondary product container on a selected one of the product cart and the implement frame;
   mounting a secondary inductor assembly to the secondary product container and connecting a plurality of product conduits between the secondary inductor assembly and a corresponding plurality of singulating meters;
   generating a primary air stream;
   seeding the first crop seeds by:
     depositing the first crop seeds into the secondary product container;
     generating a secondary air stream and directing the secondary air stream into the secondary inductor assembly;
     moving the implement frame along the first field surface with first selected furrow opener assemblies engaging the first field surface;
     directing the first crop seeds from the secondary product container into the secondary inductor assembly such that the first crop seeds are entrained in the secondary air stream and carried through the product conduits to the singulating meters and the singulating meters dispense the first crop seeds to the first selected furrow opener assemblies;
   seeding the second crop seeds by:
     depositing the second crop seeds into the primary product container;
     directing the primary air stream through a meter air conduit connected to second selected furrow opener assemblies;
     moving the implement frame and connected product cart along the second field surface with the second selected furrow opener assemblies engaging the second field surface;
     directing the second crop seeds from the primary product container to the metering device and metering the second crop seeds into the meter air conduit such that the second crop seeds are carried to the second selected furrow opener assemblies.

2. The method of claim 1 comprising, with the product cart connected to the implement frame, depositing the first crop seeds into the secondary product container by depositing the first crop seeds into the primary product container and directing the primary air stream through a demand air conduit connected between the primary inductor assembly and the secondary product container, and directing the first crop seeds from the primary product container to the primary inductor assembly where the first crop seeds are entrained in the primary air stream in the demand air conduit and transferred into the secondary product container.

3. The method of claim 2 comprising providing a fill opening in an upper portion of the secondary product container with a releasable cover operative to seal the fill opening and depositing additional first crop seeds into the secondary product container through the fill opening.

4. The method of claim 1 comprising mounting the secondary product container on the implement frame, providing a fill opening in an upper portion of the secondary product container with a releasable cover operative to seal the fill opening, and with the product cart disconnected from the implement frame, depositing the first crop seeds into the secondary product container through the fill opening and moving the implement frame along the first field surface without the product cart.

5. The method of claim 4 comprising disconnecting an output end of a cart portion of the demand air conduit that is mounted on the product cart from an input end of a frame portion of the demand air conduit that is mounted on the implement frame; sealing the input end of the frame portion of the demand air conduit.

6. The method of claim 1 comprising mounting the secondary product container on the product cart and, with the product cart connected to the implement frame, depositing the first crop seeds into the secondary product container by depositing the first crop seeds into the primary product container and directing the primary air stream through a demand air conduit connected between the primary inductor assembly and the secondary product container, and directing the first crop seeds from the primary product container to the primary inductor assembly where the first crop seeds are entrained in the primary air stream in the demand air conduit and transferred into the secondary product container.

7. The method of claim 6 comprising providing a fill opening in an upper portion of the secondary product container with a releasable cover operative to seal the fill opening and depositing additional first crop seeds into the secondary product container through the fill opening.

8. The method of claim 1 comprising:
   mounting first and second primary product containers on the product cart;
   mounting corresponding first and second metering devices to the corresponding first and second primary product containers;
   mounting corresponding first and second primary inductor assemblies to the corresponding first and second primary product containers;

seeding the first crop seeds by depositing first crop seeds into the first primary product container and directing the first crop seeds into the first primary inductor assembly and directing a demand portion of the primary air stream through the demand air conduit to transfer the first crop seeds into the secondary product container;

depositing fertilizer on the first field surface by depositing the fertilizer into the second primary product container and directing the fertilizer into the second metering device, directing a meter portion of the primary air stream through the meter air conduit and metering the fertilizer into the meter air conduit such that the fertilizer is carried to the second selected furrow opener assemblies.

* * * * *